3,060,032
FREEZABLE GELS
Martin Glicksman, Valley Cottage, N.Y., assignor to General Foods Corporation, White Plains, N.Y., a corporation of Delaware
No Drawing. Filed June 17, 1960, Ser. No. 36,723
6 Claims. (Cl. 99—131)

The present invention relates to an algin gel system prepared from a water soluble alginate. The gel system has good texture and acceptability and will not show excessive breakdown on freezing and thawing. The invention further relates to an algin gel system which is suitable for preparing frozen dessert gels.

In the past, gel systems have been prepared which are suitable for marketing in a refrigerated form. Such gel systems consisted of a gelatin gel containing added fruit which is marketed in a refrigerated dessert form. However, such gels are not readily acceptable due to marketing difficulties. The refrigerated gels typical of the prior art are susceptible to mechanical shock which results from excessive handling and which causes the gel structure to fracture and quite often results in a texture change in the gel system. Furthermore, such gels have an extremely short shelf life and cannot be retained on the store shelves for any length of time without a severe texture deterioration taking place. If the gels are not maintained at proper refrigeration temperatures, they tend to melt thereby permitting a segregation of the gel and the fruit which was suspended therein. Such products have undesirable texture characteristics and furthermore have an unsightly appearance.

In the past, it has been desired to market a dessert gel which would be suitable for food use and particularly for use in dessert products wherein the gel could be frozen, stored at temperatures below freezing and then thawed without experiencing any deterioration in quality. Such gels would not be susceptible to the problems which are presently experienced by the dessert gels on the market. In the past, attempts to employ gelatin gels which are capable of being frozen have been unsuccessful since such gels upon thawing exhibit severe syneresis and have a texture which is exceedingly grainy and unattractive to the consumer.

It is an object of the present invention to prepare a novel gel composition which is capable of being frozen and thawed without exhibiting syneresis and texture breakdown which is common to present gel systems. It is a further object of the present invention to prepare dessert gels which may be frozen and thawed without loss of texture and without exhibiting syneresis, such gels being resistant to temperature changes during storage.

It has now been discovered that the objects of the present invention may be achieved by preparing a gel by dissolving in an aqueous liquid a dry mix composition containing a water soluble alginate, a sodium salt of carboxymethyl cellulose, a salt such as a calcium salt whose cations form a water insoluble salt with alginic acid and a saccharide.

As used in the present invention, the term "alginate" includes the water soluble salts of alginic acid such as ammonium, magnesium, potassium, sodium, or other alkali metals, the preferred alginate being sodium alginate. The term "carboxymethyl cellulose" as used in the present invention refers to sodium salts of carboxymethyl cellulose having a degree of substitution of 0.65–1.40. While carboxymethyl celluloses having a degree of substitution as high as 3.0 are theoretically obtainable such carboxymethyl celluloses are not commercially available at present. The carboxymethyl cellulose referred to in the present invention also has a viscosity ranging from about 10 cps. to 60,000 cps. in a 2% water solution, the most preferable carboxymethyl cellulose being one which has a degree of substitution of 0.65–0.95 and a viscosity of about 25,000–55,000 cps. in a 2% water solution. The term "saccharide" as used in the present invention refers to saccharides which are soluble in water to the extent that at least 50 grams will dissolve in 474 mls. of water at 25 C. Saccharides such as mono-saccharides like dextrose, levulose, galactose; di-saccharides like sucrose, maltose, lactose; poly-saccharides like corn syrup solids; and derived saccharides like sorbitol and mannitol are typical of the saccharides which may be employed. The term "aqueous liquid" includes water, water extracts of various foods, vegetable juices, fruit juices, etc. in which the dry composition of the present invention may be dissolved.

While a salt such as a calcium salt whose cations form a water insoluble salt with alginic acid is preferred, salts of the other alkaline earth metals (with the exception of magnesium) may be substituted for the calcium salts. It is preferred, however, to employ calcium salts such as tricalcium phosphate, dicalcium phosphate, calcium carbonate, calcium tartrate or calcium sulfate. While more soluble calcium salts may also be employed, it is necessary in such case to control the rate of gelation since these salts are highly ionizable and permit gelation to take place too rapidly. If gelation takes place too rapidly, the resulting gel is discontinuous and has a grainy texture.

Gelation may be controlled by the use of gel retarding agents such as sodium hexametaphosphate commonly known under the trade-name "Calgon." The sodium hexametaphosphate acts as a gel inhibitor and permits a controlled rate of gelation. While the use of Calgon is eminently satisfactory where the more highly ionizable calcium salts are employed, it also provides exceptionally good results when the less ionizable salts of calcium are used but where the rate of gelation must be controlled. Other suitable gel retarding agents are other phosphates such as trisodium phosphate, tetrasodium pyrophosphate, sodium tetraphosphate, sodium tripolyphosphate, and the like, or calcium complexing agents such as sodium carbonate, sodium citrate and the like may also be used.

In addition to employing the above ingredients, it is also desirable to employ a food acid such as citric, tartaric, adipic, etc. since in most cases it is desired to have a tart dessert gel which will have an acid pH.

In carrying out the present invention an alginate such as a highly refined sodium alginate containing a minimum of foreign material was dry blended with a sodium salt of carboxymethyl cellulose and a calcium salt. In addition, a gel retarder such as sodium hexametaphosphate, an acid such as citric acid, sugar, flavor and color were added. The dry mixture was rehydrated in water and permitted to stand until a gel formed. The gel was then frozen and was ready for marketing.

The sodium alginate is employed at a level sufficient to provide a 0.25–3% and preferably a 0.5–1% solution. The carboxymethyl cellulose is employed at a level of 25%–75% by weight of the algin employed and preferably at 50% of the level. The calcium salt is employed at a level of 10% to 50% by weight of the algin and preferably 25% by weight. The gel retarding agent when employed, is used at a level of 0.25 to 50% by weight of the sodium alginate and preferably at a level of 2 to 10% by weight. The saccharide should be employed at a level sufficient to provide at least 50 grams of a saccharide in 474 mls. of water if the desired textural properties are to be obtained. If a saccharide is not employed at a level of at least 50 grams per 474 mls. of water, undesirable textural results are obtained. The product is broken, grainy and exhibits severe syneresis after thawing the frozen product. The upper level of saccharides employed will be determined only by the maximum solubility of the particular saccharide and the level of sweetness attained with such saccharide. For example, while sucrose employed at levels as high as 300 grams per 474 mls. of water produces eminently satisfactory gels from a textural standpoint, the sweetness level of such gels is undesirably high for most purposes. However, such gels are perfectly satisfactory for food purposes requiring extremely sweet gels. The preferred level when sucrose or corn syrup solids having a dextrose equivalence of 24 is the saccharide employed is 100–150 grams per 474 mls. of water.

The following examples set forth several typical compositions suitable for use as dessert gels when mixed with water or other aqueous liquid:

EXAMPLE 1

| | Grams |
|---|---|
| Sodium alginate | 4.0 |
| Carboxymethyl cellulose (degree of substitution 0.65–0.95 viscosity in 2% solution 25,000–55,000 cps.) | 2.0 |
| Calcium tartrate | 1.2 |
| Sugar | 100.0 |

The ingredients were dry blended until uniformly distributed throughout the mix. The dry materials were added to 474 milliliters of cold tap water and the dry ingredients and water admixed for 3 minutes until the dry materials dissolved. The mixture was allowed to stand for 1 hour until the gel formed at which time the gel was frozen. Upon thawing, it was found that the gel had an excellent texture and exhibited no syneresis.

EXAMPLE 2

| | Grams |
|---|---|
| Sodium alginate | 4.0 |
| Carboxymethyl cellulose (degree of substitution 0.65–0.95 viscosity in 2% solution 25,00–55,000 cps.) | 2.0 |
| Calcium tartrate | 1.2 |
| Sodium hexametaphosphate (Calgon) | 0.2 |
| Sugar | 100.0 |
| Citric acid | 3.0 |
| Flavor and color | 0.4 |

The dry ingredients excepting citric acid were dry blended until a homogeneous mixture was obtained. The dry materials were added to 450 ml. of cold tap water, and the dry ingredients and water admixed for 3 minutes until the dry materials dissolved. The citric acid was dissolved in 25 ml. of cold tap water, and added to the mixture, which was then stirred for an additional 30 seconds. The final mixture was then allowed to stand for 30–60 minutes until the gel formed. The gel was frozen and when thawed, had an excellent texture and exhibited no syneresis.

EXAMPLE 3

| | Grams |
|---|---|
| Sodium alginate | 4.0 |
| Carboxymethyl cellulose (degree of substitution 0.65–0.95 viscosity in 2% solution 25,000–55,000 cps.) | 2.0 |
| Calcium tartrate | 1.2 |
| Sugar | 80.0 |
| Sodium hexametaphosphate (Calgon) | 0.2 |
| Citric acid | 3.0 |
| Flavor and color | 0.4 |
| Fresh fruit (pineapple chunks) | 90.0 |

The dry ingredients excepting citric acid were dry blended until a homogeneous mixture was obtained. The dry materials were added to 450 ml. of cold tap water, and the dry ingredients and water admixed for 3 minutes until the dry materials dissolved. The citric acid was dissolved in 25 ml. cold tap water and added to the mixture, which was then stirred for an additional 30 seconds. The fruit was added at this point and the liquid stirred occasionally to maintain the fruit in suspension until the gel set. The gel was frozen and when thawed had an excellent texture and exhibited no syneresis.

A gel typical of the present invention was compared with several typical dessert gels of the prior art. The prior art gels included a gelatin gel, an algin gel, and a pectin gel. The pectin gels were those set forth in Example 13 of U.S. Patent No. 2,791,508 to Rivoche. The algin gels were prepared by substituting the algin for pectin in the composition used for the pectin gels.

Seven gels were prepared, frozen, thawed, and compared with respect to syneresis, gel texture and over-all acceptability.

The following gels were prepared and the formulations, except for the commercial gelatin dessert, are given in Table 1:

(1) Low methoxyl pectin gel—prepared at 0°–4° C. according to the procedure set forth in Example 13 of U.S. Patent No. 2,791,508.

(2) Sodium alginate gel—prepared at 0°–4° C. according to the procedure set forth in Example 13 of U.S. Patent No. 2,791,508

(3) Low methoxyl pectin gel—same formulation as in 1, but prepared at room temperature, 75° F. (24° C.).

(4) Sodium alginate gel—same formulation as in 2, but prepared at room temperature, 75° F. (24° C.).

(5) Alginate-CMC gel (same as Example 3, excluding color, flavor and pineapple) and prepared at room temperature, 75° F. This gel was frozen at 0° F., immediately after gelling, about 30 minutes after beginning of the preparation.

(6) Alginate-CMC gel—same as 5, but was allowed to stand at room temperature, 75° F., for 24 hours before freezing at 0° F.

(7) Gelatin gel—commercial package of a gelatin dessert was prepared according to package directions and frozen at 0° F.

All the gels were frozen in a 0° F. constant temperature room and removed after 48 hours (except sample 6 which was removed after 24 hours). The gels were allowed to thaw at room temperature (75° F.) for about 6 hours and when completely thawed, were evaluated for syneresis and over-all textural changes (Table 2).

The only satisfactory gels were samples 5 and 6, which had no syneresis, a very good eating texture and exhibited no undesirable structural breakdown.

Samples 1–4 were very grainy, coarse and broken, and exhibited up to about 50% syneresis.

The gelatin gel, sample 7, did not exhibit much syneresis, but the gel structure was severely broken and it had a very coarse, grainy eating texture.

Table 1

| Ingredients | Grams | | | | | | |
|---|---|---|---|---|---|---|---|
| | Sample 1 | Sample 2 | Sample 3 | Sample 4 | Sample 5 | Sample 6 | Sample 7 |
| Low Methoxyl Pectin (100 Gel Power) | 4.0 | | 4.0 | | | | Commercial Gelatin Dessert |
| Sodium Alginate | | 4.0 | | 4.0 | 4.0 | 4.0 | |
| Calcium Carbonate, powder | 0.48 | 0.48 | 0.48 | 0.48 | | | |
| Trisodium Phosphate | 0.6 | 0.6 | 0.6 | 0.6 | | | |
| Glucose, Anhydrous | 30.0 | 30.0 | 30.0 | 30.0 | | | |
| Sucrose, fine granulated | 80.0 | 80.0 | 80.0 | 80.0 | 80.0 | 80.0 | |
| Tartaric Acid | 3.2 | 3.2 | 3.2 | 3.2 | | | |
| Calcium Tartrate, powder | | | | | 1.2 | 1.2 | |
| Calgon | | | | | 0.2 | 0.2 | |
| Carboxymethyl cellulose | | | | | 2.0 | 2.0 | |
| Citric Acid, hydrous | | | | | 3.0 | 3.0 | |
| Water, distilled, room temperature | 400.00 | 400.00 | 400.00 | 400.00 | 475.00 | 475.00 | |

Table 2

| Sample | Percent Syneresis Ml. of Water (Net Wt. of Gel × 100) | Texture |
|---|---|---|
| 1 | 51.0 | Very grainy, coarse, broken texture. |
| 2 | 39.4 | Do. |
| 3 | 33.0 | Do. |
| 4 | 37.9 | Do. |
| 5 | 0 | Very good, smooth texture. |
| 6 | 0 | Do. |
| 7 | 4.1 | Very grainy, coarse, granular texture. |

While the foregoing invention has been described by means of several examples, reference should be made to the appended claims for a definition of the scope of the invention.

What is claimed is:

1. A dry mix for use in preparing alginate gels which do not undergo deterioration upon freezing comprising a water soluble alginate, a sodium salt of carboxymethyl cellulose, a salt such as a calcium salt whose cations form a water insoluble salt with alginic acid and a saccharide employed at a level of at least 50 grams per 474 ml. of water.

2. A dry mix for use in preparing alginate gels which do not undergo deterioration upon freezing comprising a water soluble alginate at a level sufficient to provide a 0.25%–3% solution of alginate, a sodium salt of carboxymethyl cellulose employed at a level of 25%–75% by weight of the water soluble alginate, a salt such as a calcium salt whose cations form a water insoluble salt with alginic acid employed at a level of 10% to 50% by weight of the water soluble alginate and a saccharide employed at a level of at least 50 grams per 474 ml. of water.

3. A dry mix for use in preparing alginate gels which do not undergo deterioration upon freezing comprising a sodium alginate at a level sufficient to provide a 0.25%–3% solution of alginate, a sodium salt of carboxymethyl cellulose employed at a level of 25%–75% by weight of the sodium alginate, a water soluble calcium salt employed at a level of 10% to 50% by weight of the sodium alginate, a gel retarding agent employed at a level of 0.25% to 50% by weight of the sodium alginate and a saccharide employed at a level of at least 50 grams per 474 ml. of water.

4. A dry mix for use in preparing alginate gels which do not undergo deterioration upon freezing comprising a sodium alginate at a level sufficient to provide a 0.5%–1% solution of alginate, a sodium salt of carboxymethyl cellulose employed at a level of 50% by weight of the sodium alginate, a water soluble calcium salt employed at a level of 25% by weight of the sodium alginate, a gel retarding agent employed at a level of 2% to 10% by weight of the sodium alginate and a saccharide employed at a level of at least 50 grams per 474 ml. of water.

5. The dry mix of claim 4 wherein the saccharide employed is sucrose at a level of 100–150 grams per 474 ml. of water.

6. The dry mix of claim 4 wherein the saccharide employed is corn syrup solids at a level of 100–150 grams per 474 ml. of water.

References Cited in the file of this patent

UNITED STATES PATENTS 2,441,729   Steiner _____ May 18, 1948
2,791,508   Rivoche _____ May 7, 1957